March 31, 1931.    T. T. GREENWOOD    1,798,376
CONTROL HOUSE FOR ELECTRIC DISTRIBUTION SYSTEMS
Filed Sept. 30, 1926
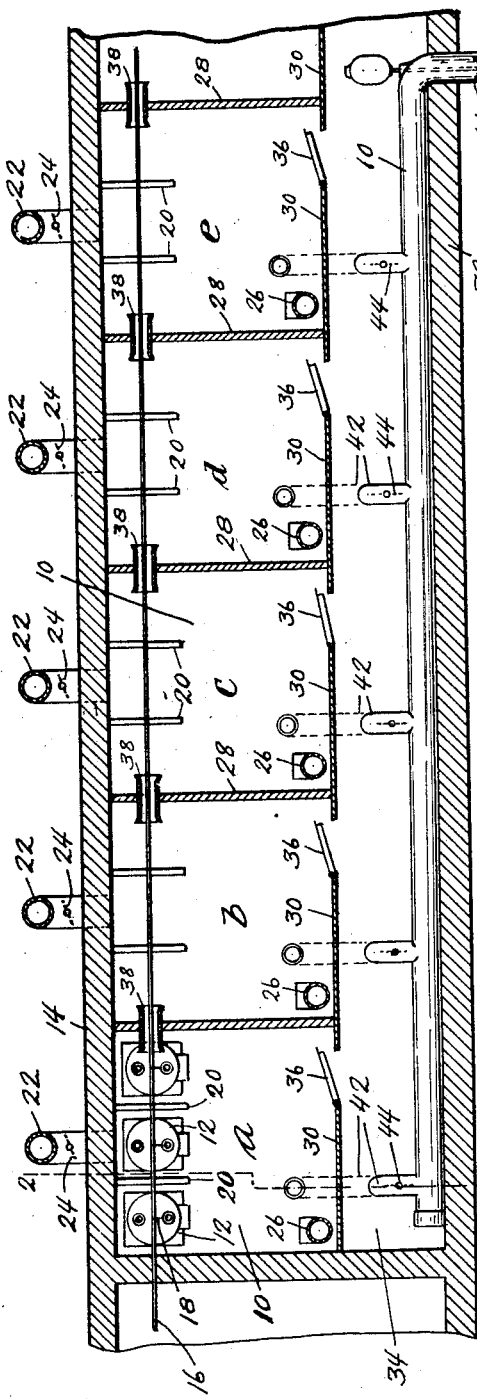
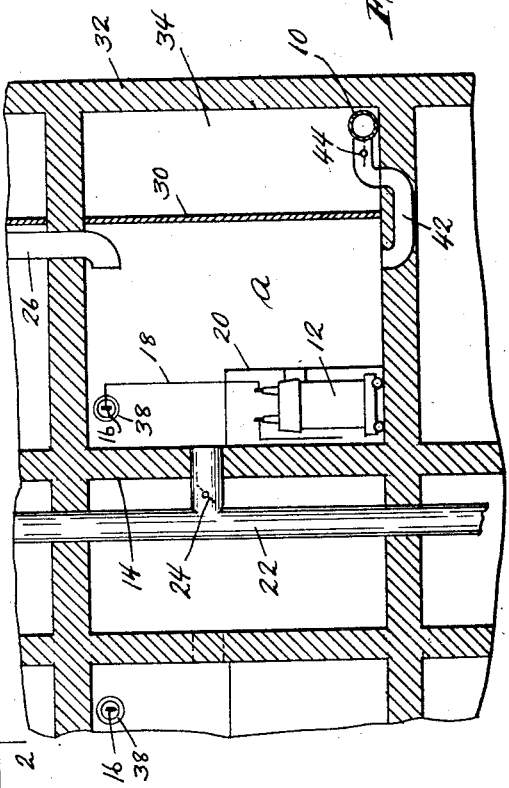
Inventor, Patented Mar. 31, 1931

1,798,376

UNITED STATES PATENT OFFICE

TALMA T. GREENWOOD, OF EAST TEMPLETON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

CONTROL HOUSE FOR ELECTRIC DISTRIBUTION SYSTEMS

Application filed September 30, 1926. Serial No. 138,790.

This invention relates to electrical generating and distributing systems and apparatus and to control houses containing the apparatus.

It has been proposed to maintain the apparatus, as the transformers, switches, conductors, etc., of a distribution system constantly immersed in an inert atmosphere of gases taken from the furnaces of the boilers operating the electric generators of the system for the purpose of excluding air from the vicinity of the apparatus, thereby to protect the apparatus and the station from danger of fires.

The electric switches, for instance, of a switch house are disposed in long rows extended along the length of a switch room and are connected with the main buses of the house and with the various line conductors extended from the house. The various switches may be electrically operated and their operating mechanisms may be disposed in another and adjoining room so that access to the mechanisms may be obtained without approaching the vicinity of the switches. Under normal conditions of operation, there is no necessity for approaching the vicinity of the switches since the switching operations usually are carried out at some remotely disposed location. It is occasionally necessary, however, to inspect the switches and to do work upon them as when a brush rod breaks, for instance, or when the contact members become unduly burned. When such an occasion arises, it will be necessary to exclude the inert gases from the entire switch room and from the vicinity of all of the switches therein and to replace the inert atmosphere with an atmosphere of pure air in order that a workman may perform his duties within the room without inconvenience and difficulty of breathing. The removal of the normally inert atmosphere from the vicinity of all of the switches removes the protection provided by the inert atmosphere and if a switch happens to open automatically under a heavy overload at this time burning oil may be thrown from the switch and start conflagration or do other damage.

It is an object of this invention to provide means whereby the inert atmosphere in the vicinity of a defective switch may be supplanted by pure air to permit a workman to work upon the switch without inconvenience and without removing the protection provided by the inert atmosphere for the majority of the other switches.

A further object is generally to improve systems of electrical distribution and control houses containing apparatus of the systems.

Fig. 1 is a sectional plan view diagrammatically illustrated of a section of a switch house and illustrating the invention.

Fig. 2 is a transverse sectional elevation taken along line 2—2 of Fig. 1.

The switch house embodying my invention includes a switch room 10 which has a plurality of line switches 12 disposed in a row therein adjacent the wall 14 of the room. A bus 16 extends above and along the line of the switches and may be connected thereto by conductors 18. The switches may be contained in separate cells formed by the cell walls 20 which extend from the rear wall 14 into the space between the switches whereby to isolate them from each other. The switch room is adapted to be maintained constantly filled with an inert atmosphere, as an atmosphere of furnace gases taken from the furnaces of the steam boilers of the system by ducts 22 which, as here shown, extend vertically along-side the wall 14 and outside of the switch room 10. The ducts are provided with outlet pipes which open into the switch room and each pipe may be provided with a valve or damper 24 so that the pipe can be closed on occasion. The switch room is also provided with a plurality of conduits 26 which open into the switch room and extend upwardly and are connected with a stack or other means to discharge the furnace gases taken from the switch room. The arrangement is such that a continual circulation of the furnace gases is constantly maintained throughout all parts of the switch room so that atmospheric air is practically excluded and danger of disastrous fires occurring in the switch room is obviated. As before stated, the switches are subjected to periodical inspection and, in addition, may at unforeseen times need repairs or replacement. Under the usual conditions, the inspection or replacing of a switch would necessitate the evacuation of the inert gaseous contents of the entire switch room and the admittance of fresh air therein so that a workman could enter and work in the room without respiratory difficulties. Under such conditions, the protection provided by the inert atmosphere is removed and at this time a disastrous fire may occur. It is the purpose of this invention to provide an arrangement whereby it is not necessary to remove the inert atmosphere from the vicinity of the majority of the switches when it is desired to work upon a particular one of the switches. To this end, I isolate convenient groups of the switches in separate compartments $a$, $b$, $c$, $d$, $e$, etc., by the partition walls 28 which may be extensions of certain of the cell walls 20 and other walls 30. Said walls 28 and 30 are co-extensive with the floor and ceiling of the switch room and enclose approximately gas tight compartments. The walls 30 are spaced from the wall 32 of the switch room to form a gallery 34 of sufficient dimensions to provide free working room for the attendants and for the removal of switches and passage of apparatus, etc.; and said gallery is adapted to contain a constant supply of pure air either by natural ventilation or by suitable air circulatory means not necessarily shown.

The walls 30 of the compartments $a$, $b$, $c$, etc., are provided with doors 36 by which entrance is gained to the separate compartments. All of the doors are normally adapted to be closed so as to prevent the dilution of the inert atmosphere within the compartments by atmospheric air from the gallery although the doors do not need to make an absolutely gas tight seal with the wall 30. Each compartment is adapted to be connected with a conduit 22 to receive a supply of inert gas and with a conduit 26 through which the inert gas passes to the stack. The bus 16 is extended through all of said compartments and the walls 28 thereof. Suitable insulators 38 may be carried by said walls to insulate the bus in its passages therethrough. Said insulators may conveniently be open porcelain tubes as shown although if leakage of inert gas or atmosphere air through said tubes between the compartments is considered harmful, the tubes may contain a gas diaphragm in an obvious manner or the insulator may be made gas tight in any well known manner not necessarily shown.

Means are also provided by which any compartment $a$, $b$, $c$, etc., may be evacuated of its inert gaseous contents and be flooded with pure air rapidly so that repairs or replacements may be made to the switches in the shortest possible time. To this end, a conduit 40 is extended along the length of the gallery 34 and is provided with branch pipes 42 which extend from said conductor into the various compartments $a$, $b$, $c$, etc. Each branch pipe is provided with a valve or damper 44 which is operable from a position within the gallery. The fresh air at some suitable pressure may be circulated through said conduit by an air moving means as a blower 46.

When it is necessary to inspect or work upon any particular switch contained in the switch room 10, the particular damper 24 controlling the flow of inert gas into the compartment containing the switch is closed, thereby preventing further flow of inert gas into the room. The particular damper 44 controlling the flow of air through the branch pipe 42 into that compartment is opened and an abundant flow of fresh air rapidly flows through the pipe into the compartment thereby sweeping the inert gases out of the room and into the conduit 26 so that the compartment shortly becomes filled with fresh and breathable air. The door 30 can then be opened and workmen can enter the compartment and work upon the switch without difficulty. If desired, the blower 46 may be operated as an exhauster to draw the inert gases out of the compartment in which case the door of the compartment may be opened and atmospheric air from the gallery will enter the compartment and displace the inert gas therein; however, I prefer to force the inert gas out of the compartment by pressure air.

As thus arranged, the protection provided by the inert atmosphere can be maintained on the majority of the switches in the switch room while work is being performed on one of the switches.

A co-pending application of William S. Edsall, filed August 12, 1926, Serial No. 128,867, and assigned to the assignee of this application discloses the broad idea of flooding the apparatus of a distribution system with inert gas.

I claim:

1. A switch house having a plurality of approximately gas tight compartments each adapted to contain one or more electric switches, means to circulate an inert gaseous fluid independently through each compartment and means to arrest the circulation of inert gases in a selected one of said compartments and forcing means to forcibly remove the inert gaseous fluid in the selected compartment and displace the inert gaseous fluid with atmospheric air whereby to permit an attendant to enter said compartment without respiratory difficulties.

2. A switch house having a plurality of approximately gas tight compartments disposed side by side and each containing one or more electric switches, a gallery extended along the length of and contiguous with said compartments, each compartment having a normally closed door opening into said gallery, means independently to circulate an inert gaseous fluid through each compartment, and means to interrupt the circulation of inert gaseous fluid through a selected one of said compartments and to displace the inert gaseous fluid in said selected compartment with fresh air prior to the opening of the door of said compartment into said gallery.

3. A control house for an electric distribution system having a plurality of approximately gas tight compartments each containing an electric apparatus, means to circulate an inert gaseous fluid from a common source through all of said compartments, means to interrupt the circulation of inert gaseous fluid through a selected one of said compartments, means thereupon to circulate atmospheric air therethrough and means to interrupt the flow of air and resume the flow of said inert gaseous fluid.

4. A switch house having a plurality of approximately gas tight compartments arranged in contiguous order in line, a bus extended through said compartments adjacent a side wall thereof, an electric switch contained in each compartment adjacent the side wall and connected with said bus, a gallery extended contiguous with and along the line of said compartments and having doors opening thereinto, means to circulate an inert gaseous fluid independently through each compartment, means to interrupt the circulation of inert gaseous fluid in a selected one of said compartments, and means to circulate atmospheric air in said selected compartment without interrupting the circulation of inert gaseous fluid in said other compartments.

In testimony whereof, I have signed my name to this specification.

TALMA T. GREENWOOD.